UNITED STATES PATENT OFFICE.

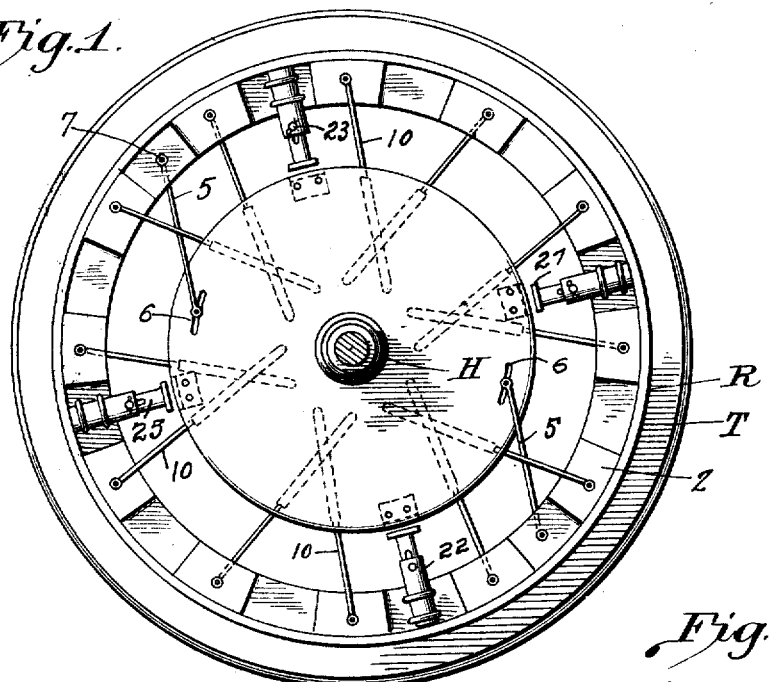
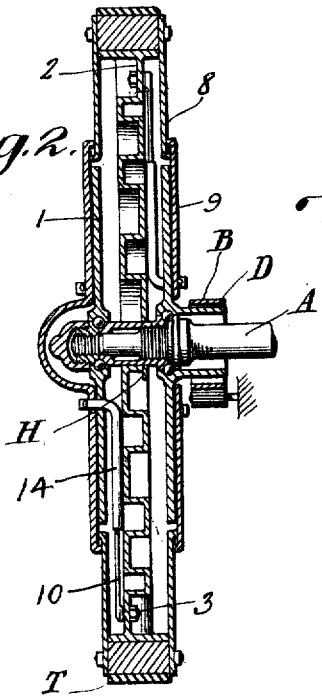
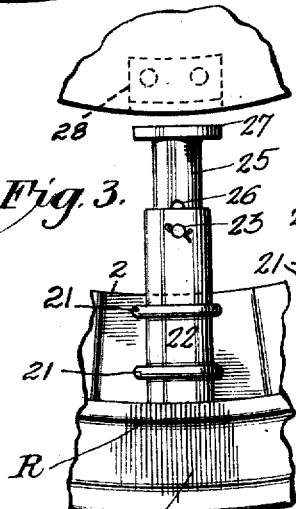
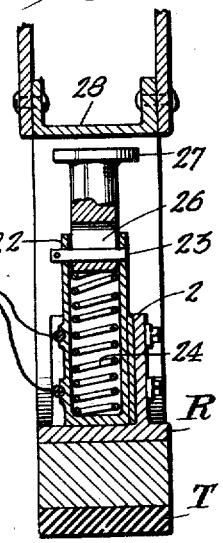
G. W. AND T. B. SHROPSHIRE.
SPRING WHEEL.
APPLICATION FILED MAY 7, 1919.
1,337,569. Patented Apr. 20, 1920.
Inventors
GEORGE W. SHROPSHIRE
Thomas B. Shropskire
BY
ATTORNEYS

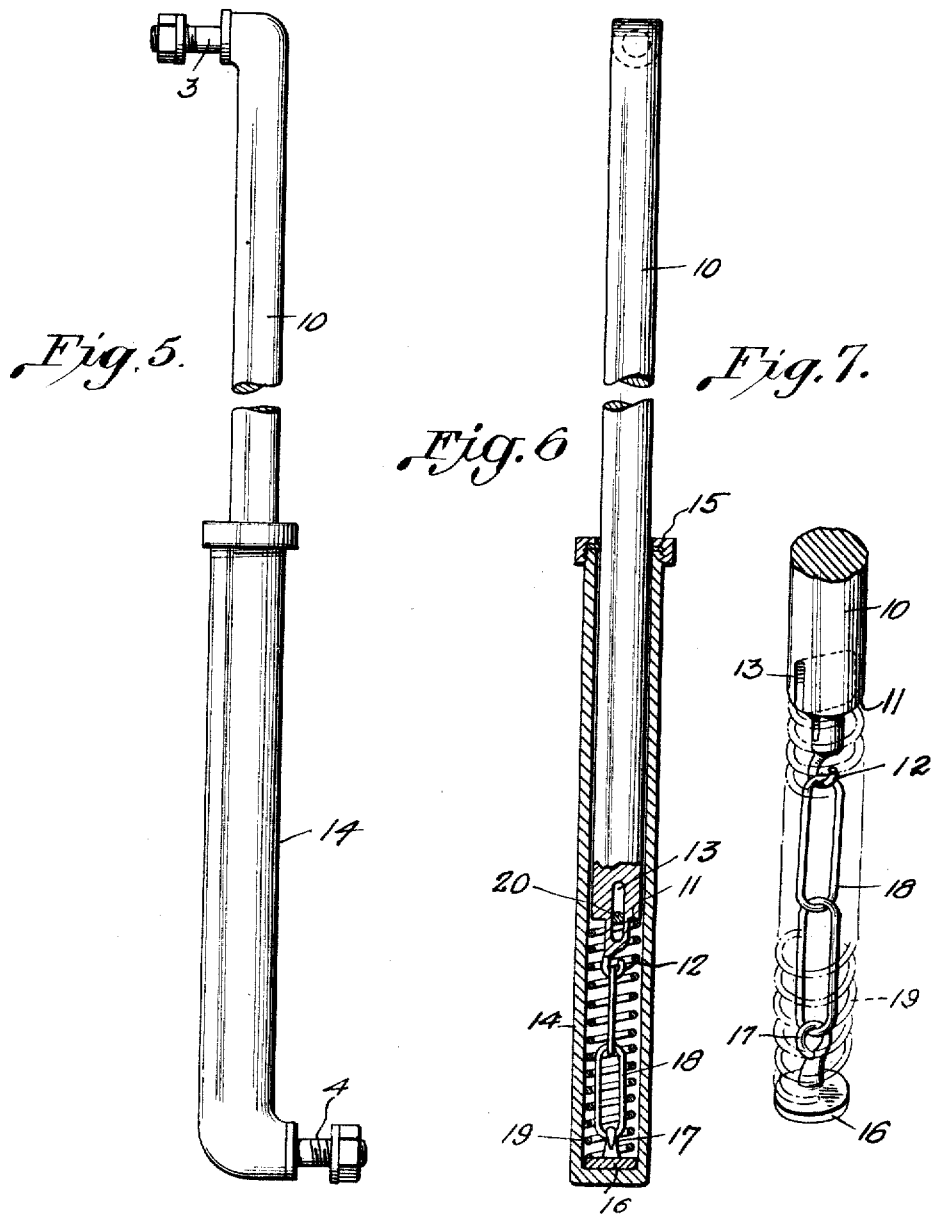

GEORGE W. SHROPSHIRE, OF BRANCH, AND THOMAS B. SHROPSHIRE, OF PETERPENDER, ARKANSAS.

SPRING-WHEEL.

1,337,569.

Specification of Letters Patent.  Patented Apr. 20, 1920.

Application filed May 7, 1919. Serial No. 295,279.

*To all whom it may concern:*

Be it known that we, GEORGE W. SHROPSHIRE and THOMAS B. SHROPSHIRE, citizens of the United States, residing at Branch and Peterpender, respectively, in the county of Franklin and State of Arkansas, have invented certain new and useful Improvements in Spring-Wheels, of which the following is a specification.

This invention relates to resilient wheels, and more especially to those having pivoted telescoping spokes; and the object of the same broadly is to produce a wheel whose resiliency will take the place of the pneumatic tire so that a comparatively hard rubber tire or in fact a steel tire may be used instead.

It is essential in wheels of this type that the hub and rim have a certain relative movement radially, and therefore each spoke must be capable of expansion or contraction longitudinally at what would be the top and bottom of the wheel, and also those spokes at what would be the sides of the wheel must be capable of pivotal action. These essentials are brought out in the invention, and yet we have been able to use crossed spokes which are known the best to resist relative rotary movement between the hub and rim.

Another object of the invention is to employ auxiliary means for limiting or restraining said relative rotary movement.

Yet another object is to provide spring buffers which come into action only under excessive movement of the hub and rim relatively.

The final object of the invention is to improve the structure of the spring spoke employed.

Preferred details are set forth in the following specification and claims and reference is made to the drawings wherein—

Figure 1 is a side elevation of this wheel with the casing plates omitted;

Fig. 2 is a vertical section of the wheel complete;

Fig. 3 is an enlarged side elevation of one of the buffers and its stop, and Fig. 4 is a section through the same;

Fig. 5 is an enlarged side elevation, and Fig. 6 a longitudinal section through one of the spokes;

Fig. 7 is a still further enlarged perspective detail showing the arrangement of the spring within a spoke.

On an axle A by means of suitable bearings is mounted a hub H with whose details of construction we are not concerned, and the hub will be loose on the axle for the front wheels of a motor vehicle or fast thereon for the drivers.

At the inner end of the hub is a drum D around which extends the usual brake band B as seen in Fig. 2. The wheel rim R may carry any appropriate tire T. All details of the parts mentioned are unimportant.

The hub of this improved wheel carries two spaced disks 1, and the rim carries an internal and preferably sinuous or corrugated flange 2. Through holes in the corrugations thereof at intervals are pivoted the right angular outer ends or cranks 3 of the telescopic spokes best shown on Sheet 2, while the inner ends of these spokes are turned at right angles or cranked as shown at 4 and pivoted in alternate disks 1 throughout the series around the wheel, the bodies of the spokes preferably crossing each other as seen in Fig. 1. At intervals tie rods 5 project substantially tangentially from points near the edges of the hub plates, which latter may be slotted as seen at 6 so that the inner ends of these rods have a little play or lost movement, and their outer ends 7 are pivoted to the flange 2. To exclude dust and dirt facing or casing plates may house the elements described, as seen in Fig. 2, the outer plates 8 being in the form of rings carried by the rim and bent outward away from each other or flanged at their inner edges, while the inner plates 9 are rings inclosing the hub on the outer sides of the disks and bent toward each other at their outer edges into flanges which lap those of the outer plates. The cranks 4 on the spokes may well pass through the disks and inner plates 9, and nuts or pins fasten all parts together.

The telescopic spring spoke forming an essential element of this invention comprises a male member 10 which is at the top in Figs. 5, 6 and 7, its lower end being shouldered at 11, projecting below the shoulder and by preference hooked as at 12, and the body of this member slotted longitudinally as at 13, the slot extending above and below the shoulder. The female member 14 is tubular, and is provided at its lower end with the crank 4 above mentioned and its outer end receives the inner end of the male member for a considerable distance. Packing 15 is provided at the upper end portions of the female member 14. A button 16 rests on the closed end of the female member and has a hook 17, and a pair of links 18 loosely connecting this hook with that on the male member. A helical spring 19 rests on the button, surrounds the hooks and links, and rests at its upper end beneath the shoulder 11 and also against a pin 20 which extends through the female member and through the slot 13. The strength of this spring is sufficient, when a normal load is upon this spoke, to hold the parts relatively in the position best seen in Fig. 6. In other words, the spring permits the members of the spoke to telescope in either direction. If greater load is thrown onto the male member, it may descend and the shoulder 11 will compress the spring upon the button 16 while its slot 13 moves down over the pin 20. At this time a similar spoke at the opposite side of the wheel must necessarily expand in length, and therefore if the male member rise from the position shown in Fig. 6 so that its slot moves upward over the pin 20, the links 18 would cause the rise of the button 16, and the spring 19 would be compressed between the button and the pin 20. The spring spoke is thus rendered expansible or contractible within limits prescribed by the length of the slot 13 and the strength of the spring and other parts, and the pivotal connection of its cranks 3 and 4 with the rim and hub, respectively, permits the relative movement of these parts which is essential in a spring wheel, the tie rods prohibiting such movement to a dangerous extent.

The buffer best shown in Figs. 3 and 4 is illustrated as employed at four equidistant points upon the wheel of Fig. 1. Its purpose is to assist the spring spokes in times of emergency, as when the vehicle strikes an unusual obstruction or gully or is overloaded. Mounted preferably within one of the depressions of the corrugated flange 2 by suitable means such as clips 21 is a barrel 22 having an open mouth at its inner end and a transverse fixed pin 23 adjacent its mouth. Within the barrel is an expansive spring 24. A plunger 25 is slidably mounted within the mouth of the barrel, its body being slotted at 26 to loosely engage the pin 23, and its outer end resting on the spring 24. Its inner end may have a head 27. Secured in any appropriate manner to the hub or hub disk adjacent said head is a bumper or stop 28. In the normal position of the parts of this wheel the head and stop will not quite contact with each other, being spaced as seen in these views and Fig. 1 so that under ordinary vibrations of the spokes the buffers will not come into play; but it is quite obvious that any unusual or extraordinary relative movement of the parts will cause the stop at the lower side of the hub to strike the head of the plunger beneath, and the plunger will descend into its barrel as its spring permits.

It is within the spirit of the invention that these devices could be detachable from the wheel, so that they need be employed only in times of special stress. Also the specific construction of the buffers does not require the specific construction of telescopic spoke herein described, although some equivalent spoke should be employed to permit the successful operation of a spring wheel.

Having thus described the invention, what is claimed as new is:

1. The combination with a hub and rim, of barrels carried by the rim, springs arranged in said barrels, plungers carried by said barrels and engaged by said springs, stop elements carried by the hub, and yieldable spokes normally retaining said plungers in spaced relation to said stop elements.

2. The combination with a rim and a hub, of spokes connecting said rim and said hub and including slidably connected sections, a head slidably arranged within one section of each spoke, links connecting said heads to the other sections, and coil springs surrounding said links and confined between said heads and one of the sections of each spoke.

3. In a spring wheel, a hub, and a rim connected therewith for limited relative radial movement; combined with stops carried by the hub near its periphery, and opposite each stop a barrel clipped to the rim and open at its radially inner end, a pin fixed across the barrel, a plunger telescopically mounted in the barrel and having a longitudinal slot embracing said pin, the head of the plunger spaced from its stop under normal load on the wheel, and an expansive spring in the barrel beneath the plunger.

4. A spring spoke comprising a male member having a hook at its inner end, a shoulder around the shank of the hook and having a slot through its body extending longitudinally to both sides of said shoulder; a female member having a tubular body slidably lapping the male member and closed at its outer end; a button having a hook, links loosely connecting said hooks; a pin passed through the female member and extending through said slot, and a helical spring within the female member around said links and hooks, one end resting against said button and the other against said shoulder and also against said pin when the spoke is sustaining its normal load.

In testimony whereof we affix our signatures.

GEORGE W. SHROPSHIRE. [L. S.]
THOMAS B. SHROPSHIRE.

Witnesses:
O. O. BRYAN,
J. N. PENDERGRASS.